Oct. 6, 1931.  F. H. LANDRUM  1,825,672
APPARATUS FOR TESTING SEALED CONTAINERS
Original Filed Oct. 10, 1927   12 Sheets-Sheet 7
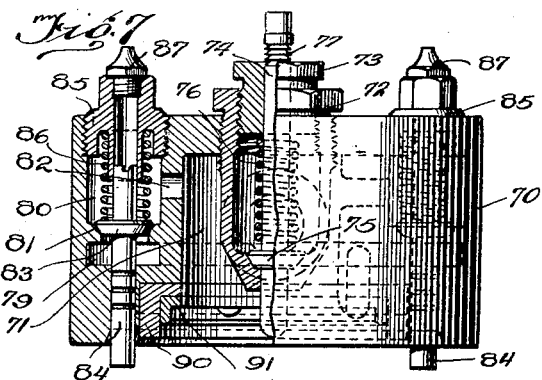
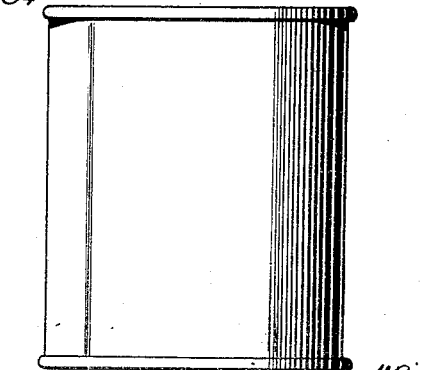
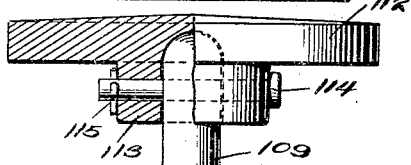
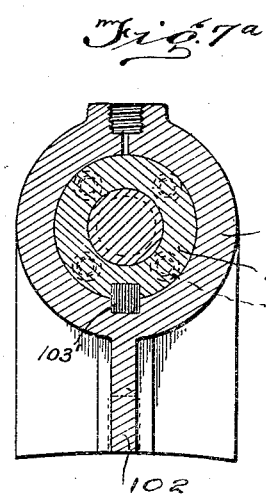
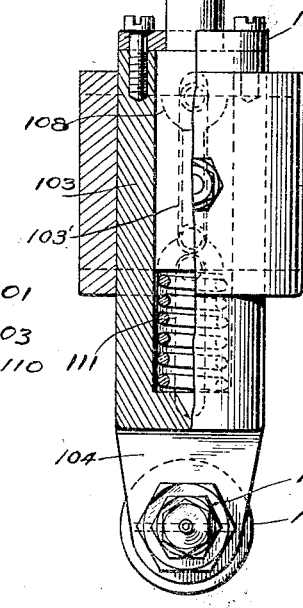
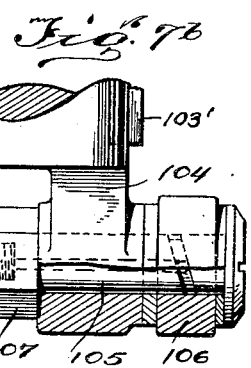
Inventor
Francis H. Landrum
by O'Neill & Bunn
Attorneys Oct. 6, 1931.  F. H. LANDRUM  1,825,672
APPARATUS FOR TESTING SEALED CONTAINERS
Original Filed Oct. 10, 1927   12 Sheets-Sheet 8
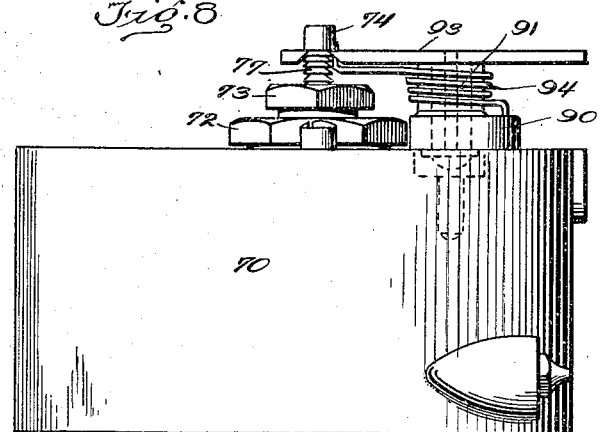
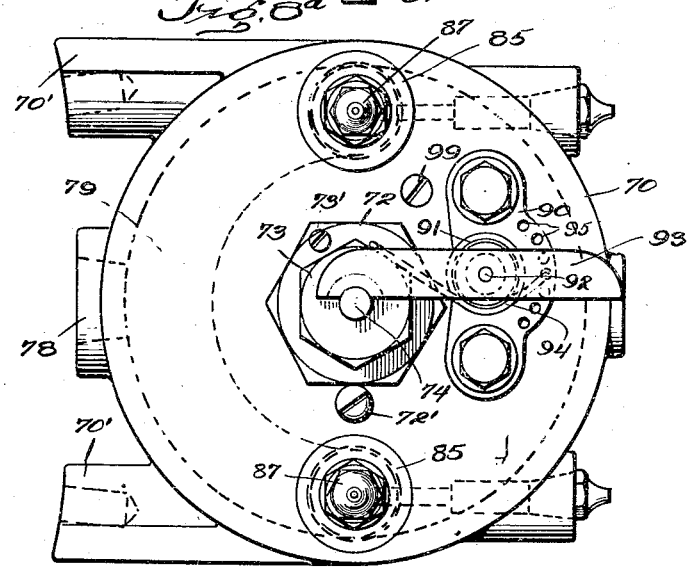
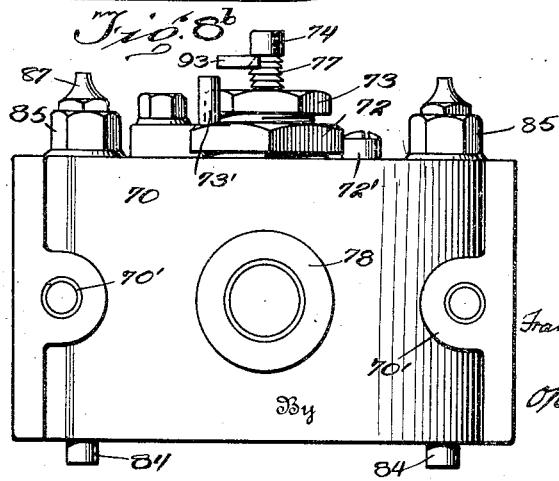

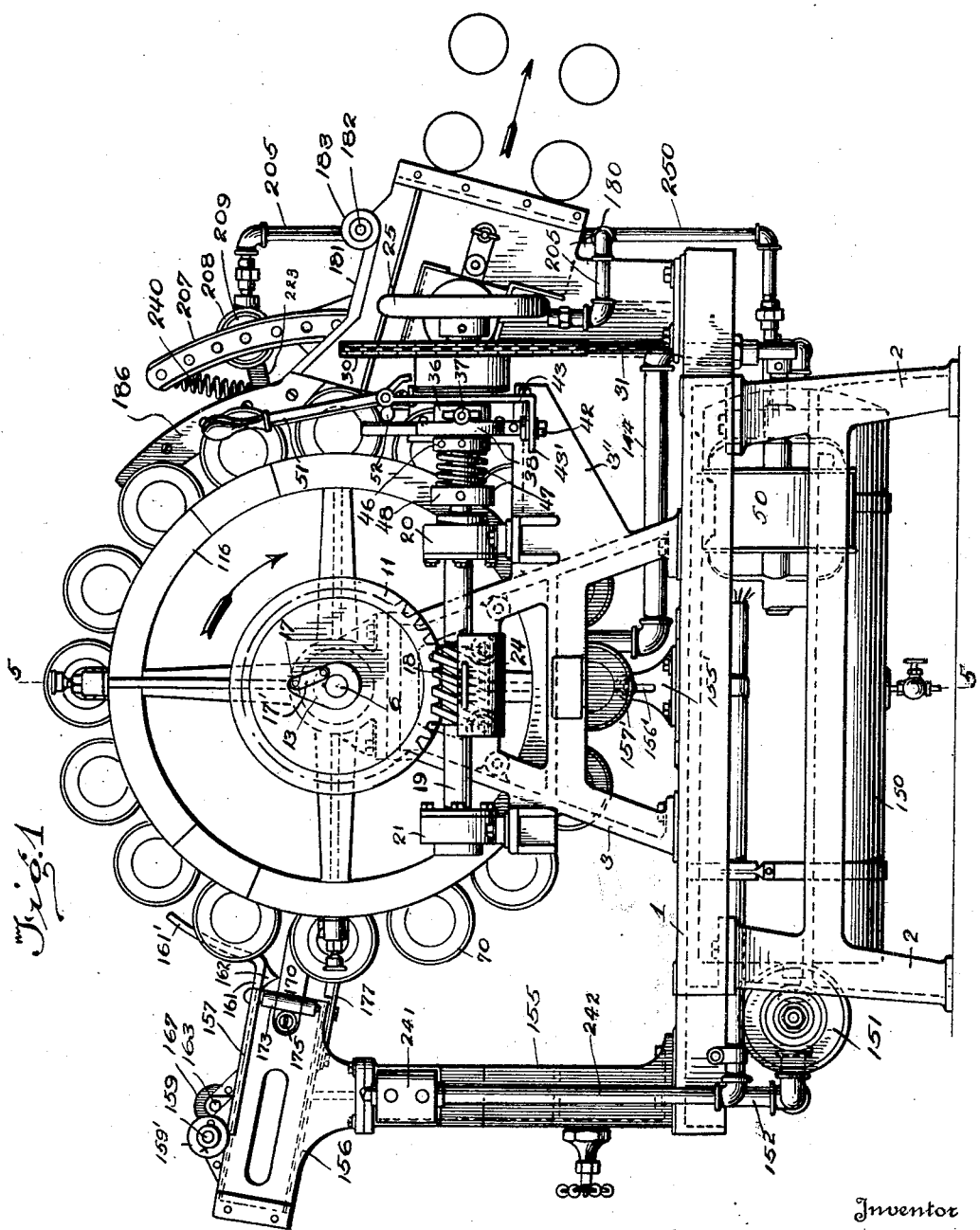

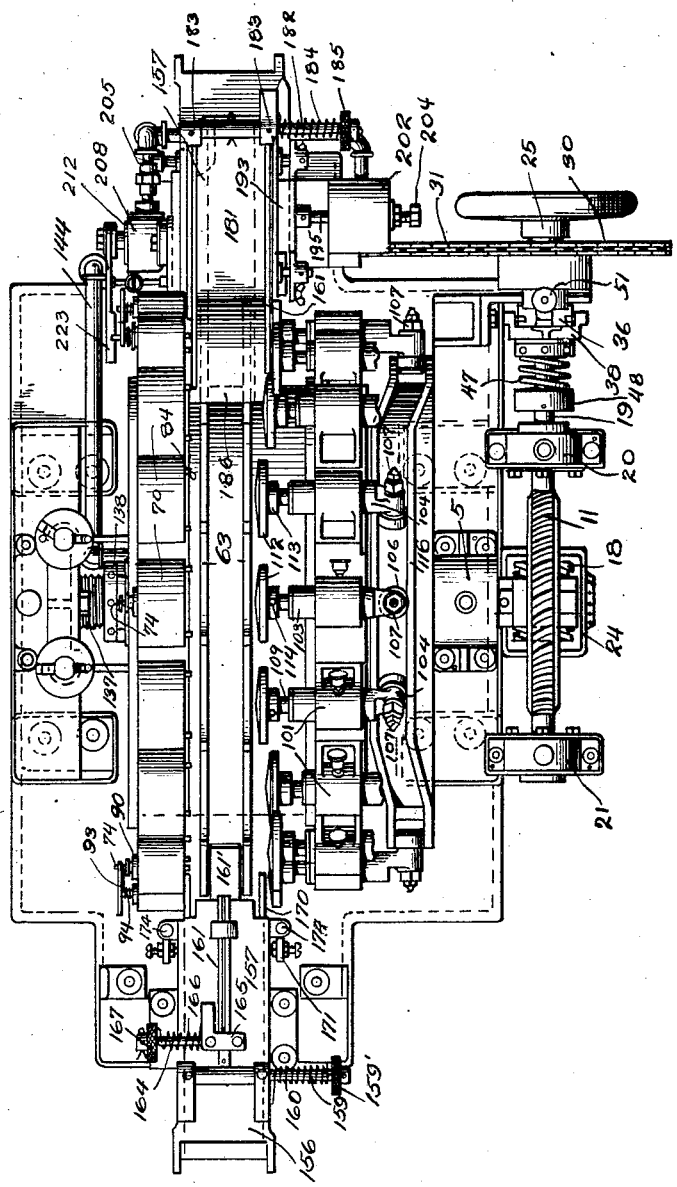

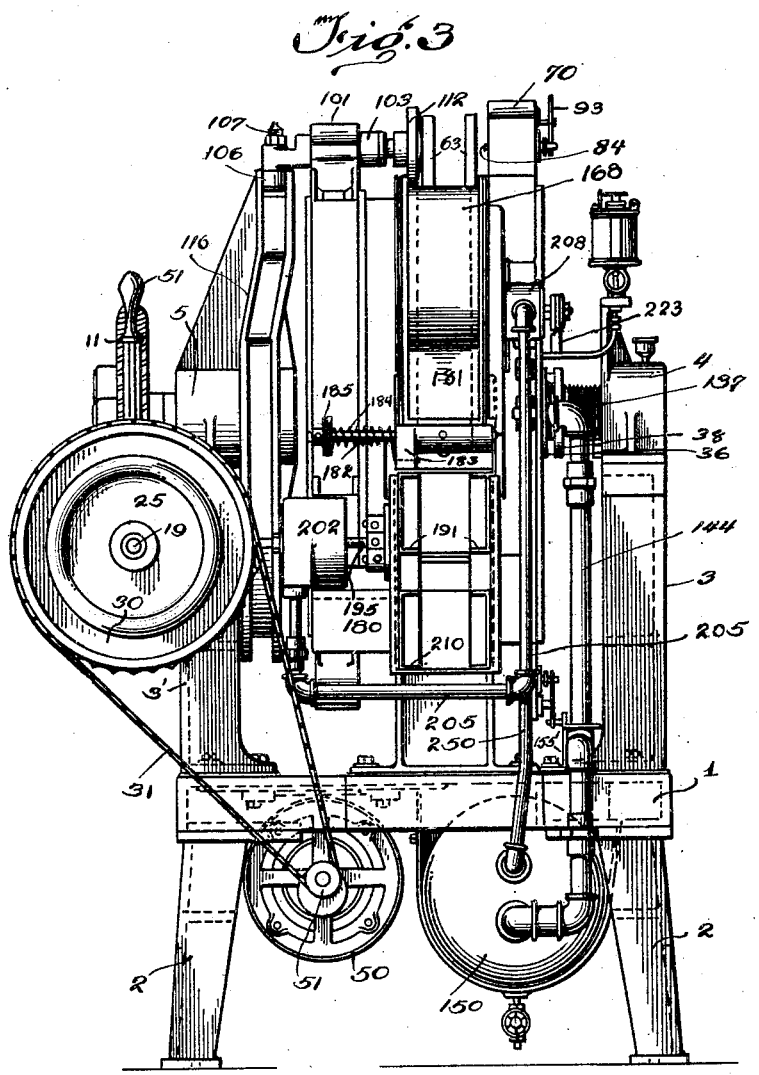

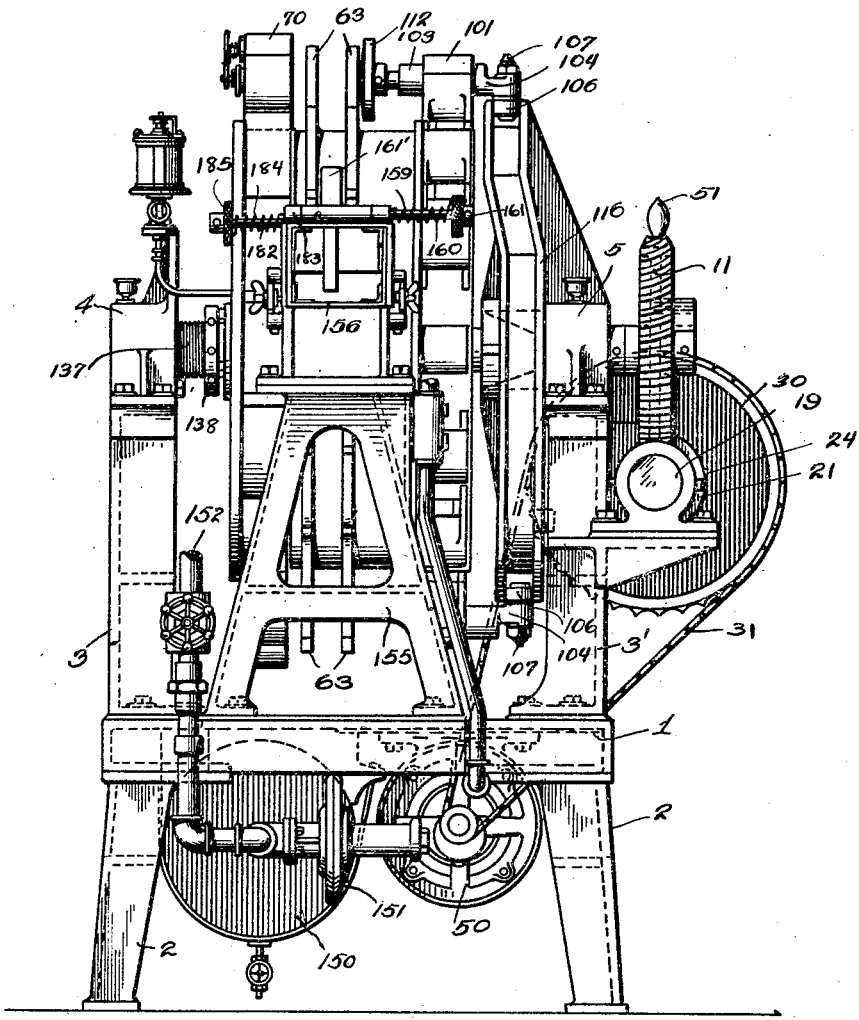

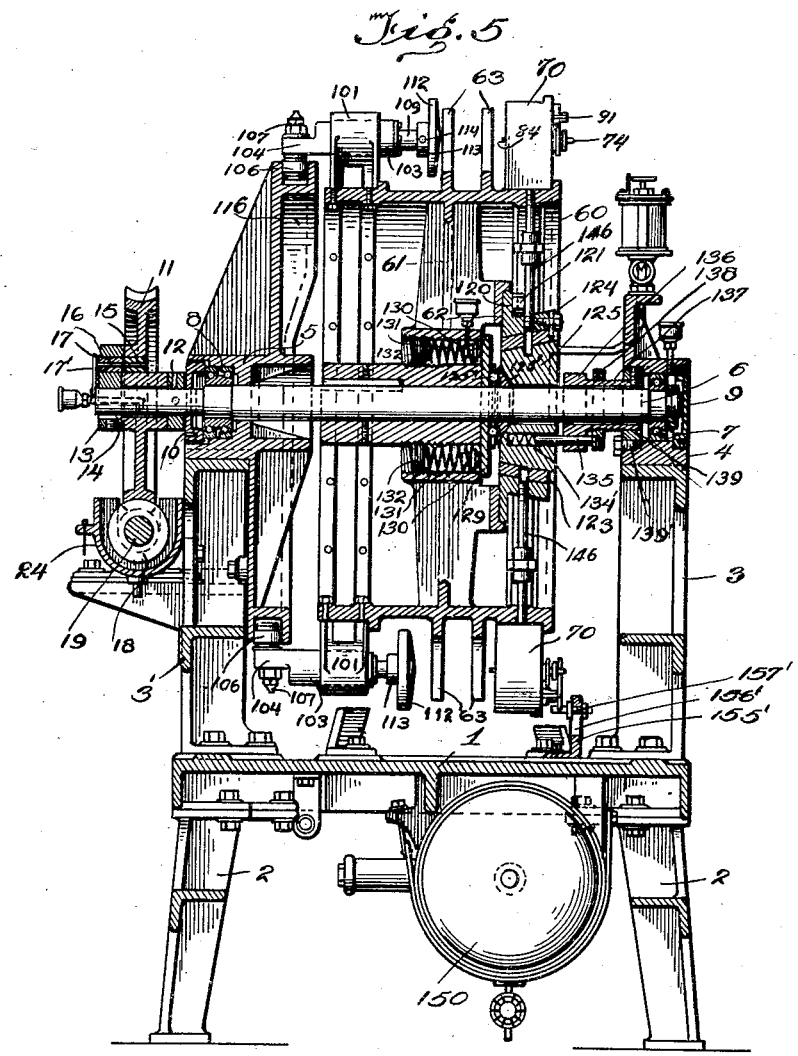

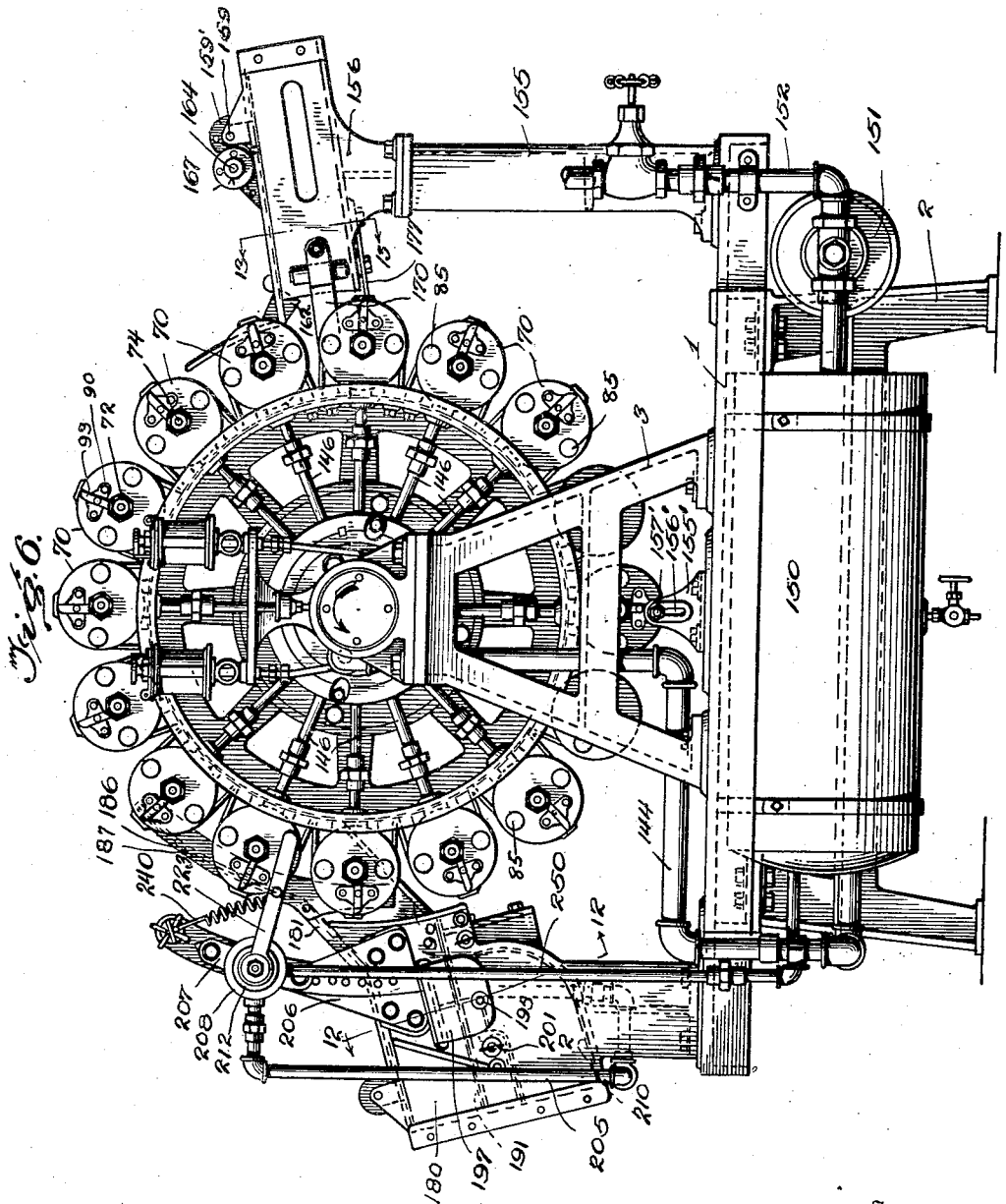

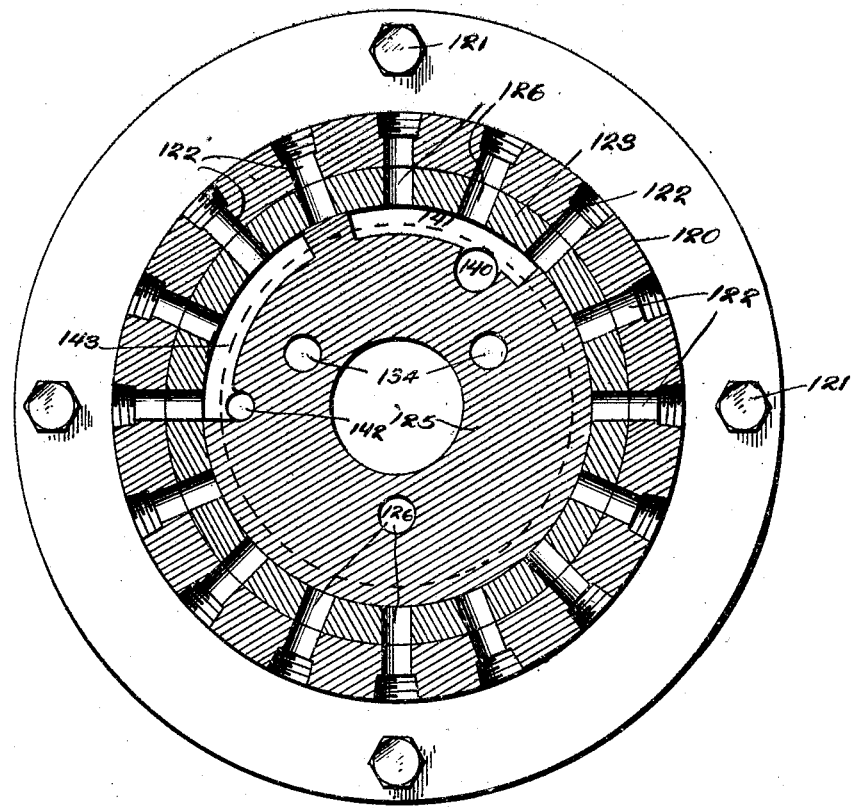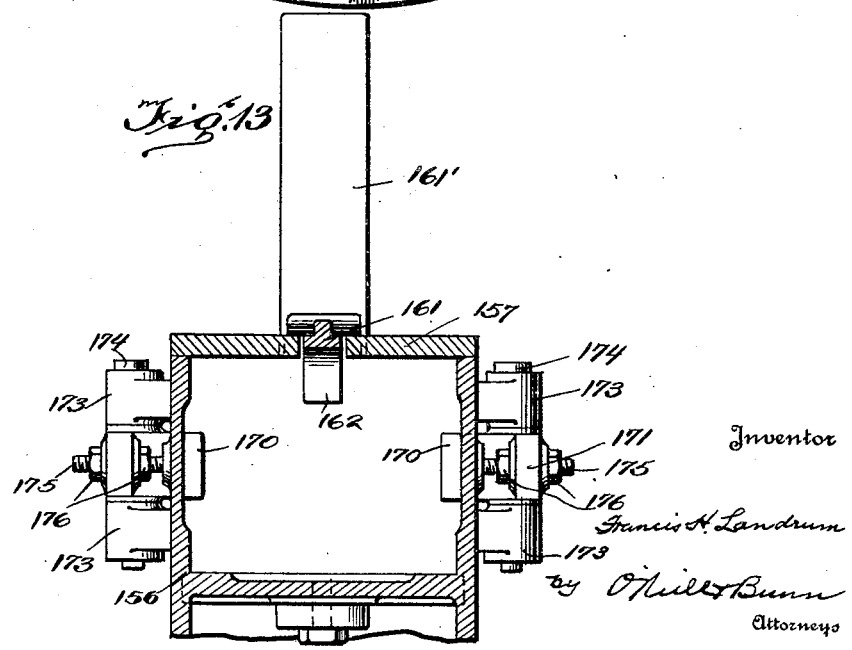

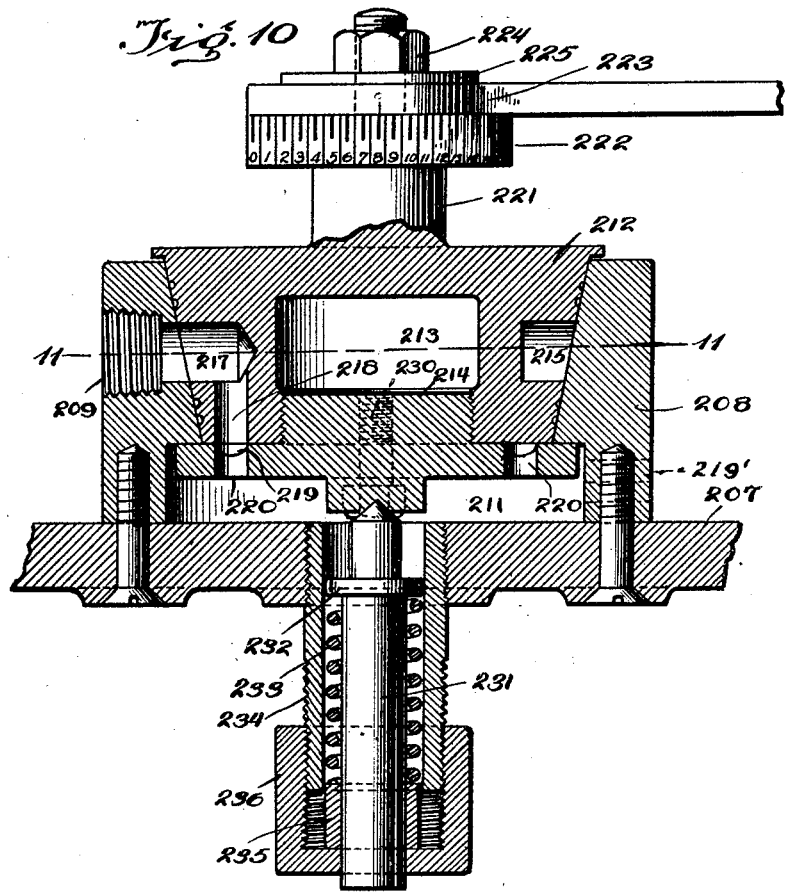
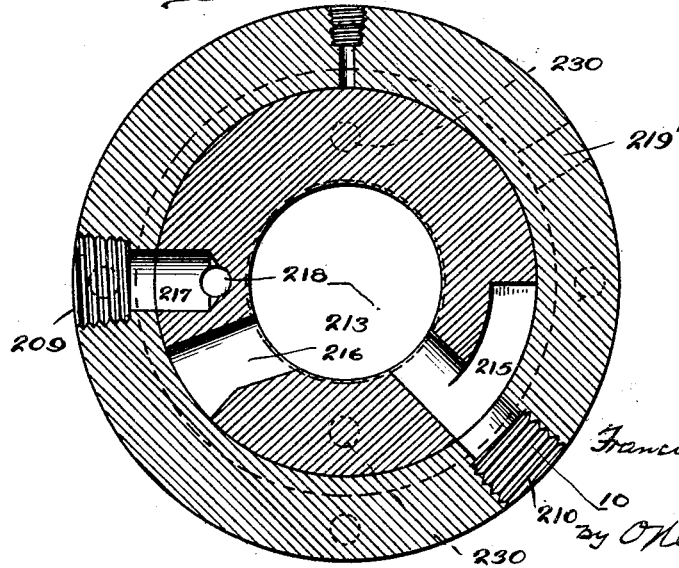

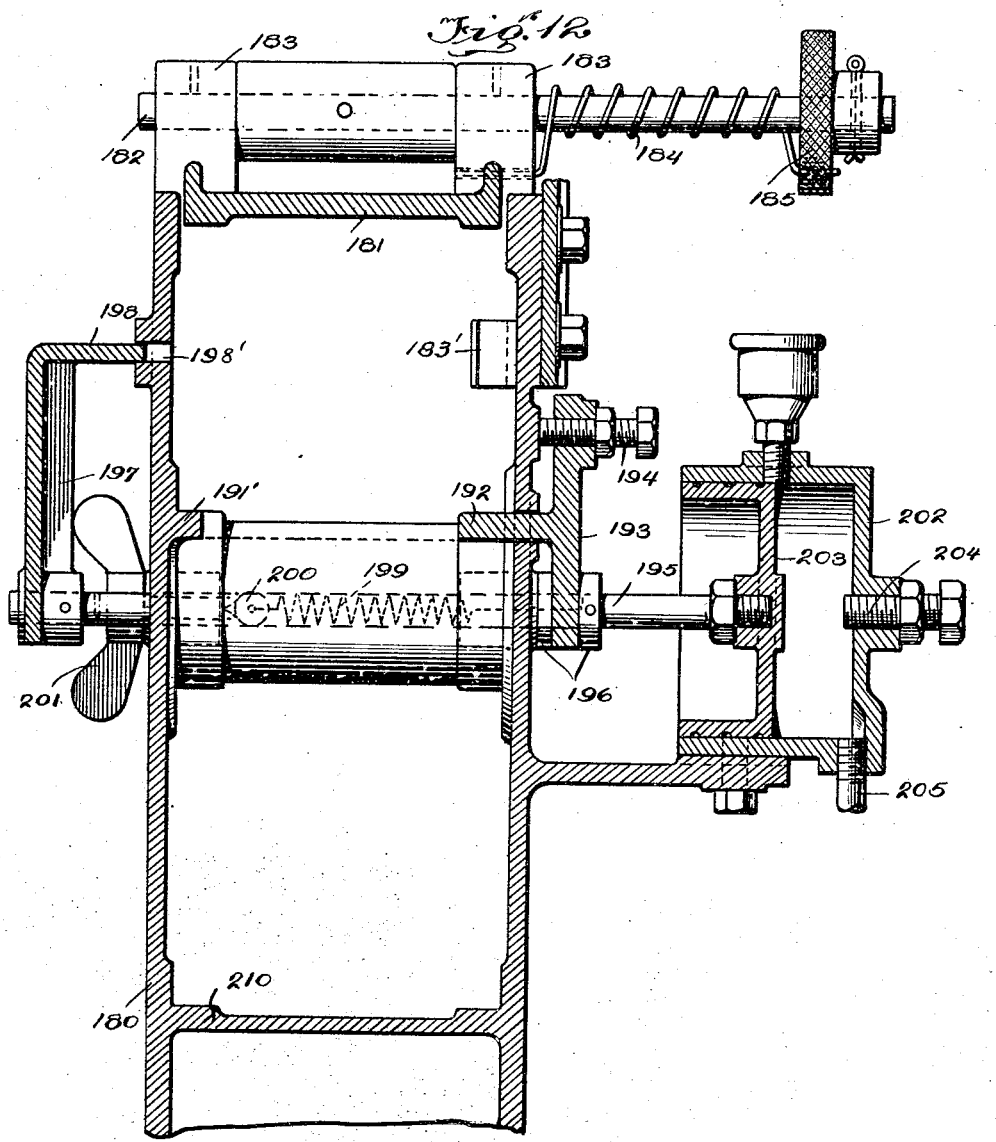

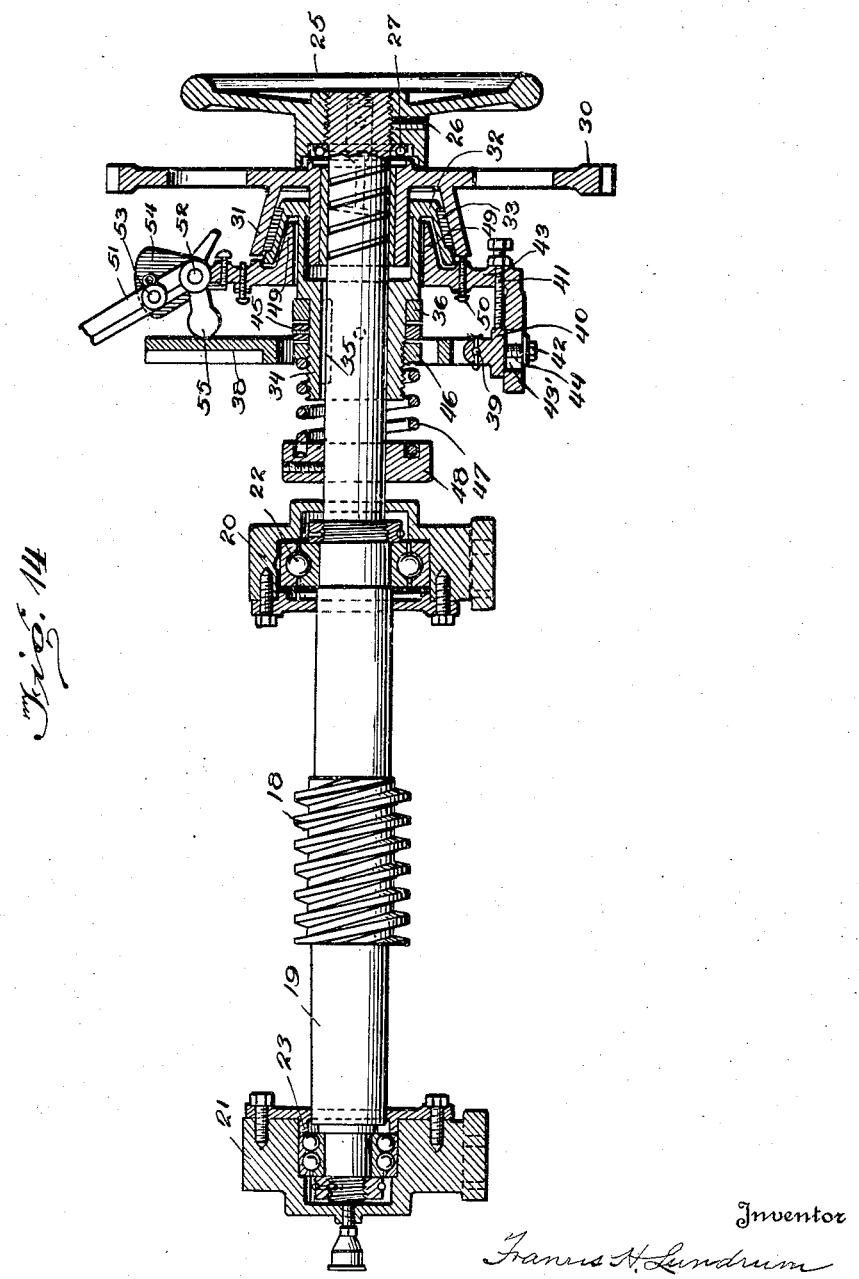

Patented Oct. 6, 1931

1,825,672

UNITED STATES PATENT OFFICE

FRANCIS H. LANDRUM, OF SAN FRANCISCO, CALIFORNIA

APPARATUS FOR TESTING SEALED CONTAINERS

Application filed October 10, 1927, Serial No. 225,134. Renewed May 24, 1930.

In a copending application, Serial No. 225,133, filed of even date herewith, there is disclosed an automatic machine for testing sealed containers of foodstuffs and other commodities, involving the application of a novel method of effecting the testing and segregating of deficient containers from those that are normal, and the present invention relates to a machine of the same general type for carrying out the method in an analogous manner, but involving certain structural and operative changes or modifications that result in a simpler and sturdier machine that may be operated at a much higher rate of speed than is possible with the former machines, so that the testing of the containers may be greatly expedited, and the necessity of adjustments and repairs to the machine reduced to a minimum.

The invention is illustrated in the accompanying drawings, in which:—

Fig. 1 is a front elevation of the apparatus.

Fig. 2 is a plan view of the same.

Fig. 3 is a right end elevation.

Fig. 4 is a left end elevation.

Fig. 5 is a sectional elevation on line 5—5 of Fig. 1.

Fig. 6 is a rear elevation.

Fig. 7 is an elevation, partly in section, of a testing unit, including a vacuum chamber and the reciprocating plunger associated therewith.

Fig. 7a is a cross section through the plunger and its support.

Fig. 7b is a fragmentary detail of the plunger construction.

Fig. 8 is a side elevation of one of the vacuum chambers.

Fig. 8a is a plan view of the same.

Fig. 8b is an end elevation thereof.

Fig. 9 is a sectional plan view of the central distributing valve.

Fig. 10 is a sectional elevation of the valve controlling the operation of the segregating means.

Fig. 11 is a section on line 11—11 of Fig. 10.

Fig. 12 is a sectional elevation of the discharge chute, taken on line 12—12 of Fig. 6.

Fig. 13 is a sectional elevation of the feed chute on line 13—13 of Fig. 6.

Fig. 14 is a side elevation, partly in section, of the main operating shaft and its accessories.

The invention is directed to a machine for testing sealed containers, which normally carry a materially reduced interior pressure or partial vacuum, some portion of the enclosing wall of the container, usually the closure element, tends to move, bulge or convex outwardly, when the fluid pressure within the container exceeds the external pressure. The machine of the present application, like that of the copending application aforesaid, includes automatic means for applying a reduced fluid pressure to the exterior of the container or a portion of the container wall, which will move or bulge outwardly when the predominant pressure is on the inside of the container, and so regulating the reduction of the external pressure that the defective containers will be evidenced by the outward movement of the wall section thereof, which movement is communicated automatically to an indicating and segregating mechanism, with the result that containers having high internal pressures or deficiencies in the degree of vacuum, are automatically separated from those in which a low internal pressure or a normal degree of vacuum is maintained.

While the specific embodiment of the invention, as illustrated, is adapted to test the ordinary type of cylindrical metal cans having a movable end closure adapted to be flexed inwardly, when the desired degree of pressure reduction or partial vacuum is induced in the container, usually during the processing operation, it will be understood that the machine may be readily modified to accommodate containers of other shapes and types, without departing from the invention, provided that the containers or receptacles each have a wall or enclosing section capable of movement under the effects of differential pressures within and without the container, the changes or modifications of the machine to adapt it to different forms or types of containers being well within the expected skill of one familiar with the art.

Referring to the drawings and more particularly to Figs. 1 to 6, inclusive, 1 indicates the base plate or table, which supports all of the mechanism and is provided with supporting legs 2. Mounted near the front and rear edges of the table 1 are A frames 3, 3' to the tops of which are secured pillow blocks or housings 4 and 5, respectively, in which is journaled a transverse shaft 6, provided with anti-friction bearings 7 and 8, supported in the housings aforesaid. The opening in housing 4 is closed by a cap 9, while that in the opposite housing 5 is provided with a perforated cap 10 through which the reduced outer end of shaft 6 passes.

Mounted loosely on the end of shaft 6, which projects beyond the housing 5, is a worm gear 11, which abuts a collar 12, which is fastened to the said shaft, and is retained in position by a second collar 13, which is secured to the end of the shaft by a suitable spline 14. The hub of the worm gear 11 is bored to receive a hardened steel bushing 15 and the upper portion of collar 13 is similarly bored to receive an aligning hardened steel bushing 16 and the two aligning bushings receive a shear pin 17 held in position by a keeper 17' fastened to collar 13, the parts being so constructed and arranged that excessive stresses, such as might be produced by a container becoming wedged in the machine or other operating conditions which would produce an overload on the machine, would cause the steel bushings to cut the shear pin and stop the operation of the machine.

The worm gear 11 is driven by a worm 18, preferably formed integrally with the shaft 19, which is journaled in roller bearings 22 and 23 mounted in housings 20 and 21, respectively, which are secured to brackets formed integrally with the A frame 3. The outer end of the shaft 19 is provided with a hand wheel 25 secured to the shaft by a threaded connection and locked in position by set screw 26, said hand wheel constituting the means for rotating the shaft 19 and actuating the parts driven thereby manually, when occasion for such operation arises. Loosely mounted on the shaft 19 adjacent the hand wheel 25 is a sprocket 30, which is engaged by a chain 31 driven by a sprocket 51 on the end of the shaft of an electric motor 50, bolted to the under side of the table 1. The inner face of the hand wheel 25 is counterbored to receive an anti-friction thrust bearing 27 interposed between the hand wheel and the hub of the sprocket 30. The inner face of the sprocket 30 is provided with a frusto-conical projection 31, which cooperates with a friction band 33 secured to the frusto-conical end section 32 of the sleeve 34 slidably connected to the shaft 19 by a key or feather 35. The sleeve 34 is provided with a stationary collar 36, which is engaged by clevis pins 37, supported in a yoke frame 38, which, in turn, is supported at its lower end on a horizontal shaft 39 mounted in an adjustable slide 40. The slide 40 is adjustably secured by a threaded bolt 44 extending therefrom and engaging a slot 43' in bracket 43, which, in turn, is bolted to an extension bracket 3" on A frame 3, said bolt being provided with a lock nut 42. The slide 40 is accurately adjusted by means of a set screw 41 mounted in bracket 43 and locked in position by a suitable lock nut. The sleeve 34 is provided with an adjustable collar 45 bearing against collar 36 and is locked in its adjusted position by suitable set screws. The inner end of the sleeve 34 is externally screw threaded and is engaged by an interiorly threaded collar 46, which constitutes an abutment for a helical spring 47, the opposite end of the spring bearing upon a fixed collar 48 secured to shaft 19, said spring serving as a means for adjusting the tension imposed on the clutch, which connects the sprocket 30 to the shaft 19.

The outer face of the bracket 43 is provided with a frusto-conical extension 49, which engages the inner conical face of the sleeve extension 32. One or more set screws 50, provided with lock nuts mounted in bracket 43, serve to space the sprocket 30 with respect to the bracket 43, by engaging the peripheral edge of the conical extension 31 on said sprocket, as specifically illustrated in Fig. 14. The inner end of the bracket 43 is provided with a segmental projection 54 carrying a stud 52, upon which is pivoted a clutch operating handle 51, said handle having an angular abutment 55 engaging a yoke frame 38 to slide collar 34 against the tension of spring 47 and disengage the clutch member 32 on the outer end of said collar and the cooperating clutch member 31 on the sprocket 30, when the said lever is moved to left hand position, as illustrated in Fig. 14. When the handle 51 is moved in the opposite direction, the abutment 55 is moved away from yoke frame 38 and permits the spring 47 to force the sleeve 34 to the right, thereby engaging the clutch member thereof with the clutch member of the sprocket 30, so that the shaft 19 will be rotated by the sprocket. When the clutch operating handle is moved to intermediate or vertical position, the clutch is in neutral and either sprocket 30 or the shaft 19 may be rotated independently of each other, but, when the handle is moved to its extreme left position, the clutch member 32 on the end of sleeve 34 engages the conical extension 49 on the bracket 43 and the shaft 19 is locked against rotation. This particular coordination provides an effective frictional clutch engagement between the main operating shaft 19 and the driven sprocket 30, which admits of the shaft 19 being rotated independently of the sprocket for purposes of adjusting the driven mechanism, and also admits of the shaft 19 being disconnected from the driving sprocket at will, or connected with said sprocket by a yieldable connection, which would permit slippage between the engaging members 31 and 33 of the clutch should undue strains be imposed upon the machine.

Splined to shaft 6 is a hollow cylindrical drum 60 having a central spider 61 having an annular seat 62 on one face, which serves as a support for certain elements of a central distribution valve, to be hereinafter explained. The periphery of the drum is finished with a series of parallel spaced curved fingers 63, which constitute pockets to receive the cylindrical containers to be tested. These pockets are disposed in regularly spaced order about the circumference of the drum and serve to accurately position the containers with reference to the testing apparatus.

Secured to the peripheral face of the drum in axial alignment with the several pockets 63 are vacuum chambers 70. These vacuum chambers, which are identical in construction, are shown in detail in Figs. 7 and 8. Each of said chambers comprises a hollow casting 70 adapted to be secured to the peripheral face of the drum by bolts passing through holes in the drum and engaging threaded openings in the integral bosses 70' on the casting 70. The chamber 70 is provided with a bottom opening bounded by an inwardly tapering rim, within which opening is secured a sealing washer or gasket 90 of rubber or the like, which is held in position by a ring 91, which, in turn, is fastened about the inner peripheral edge of the opening in the casting by suitable screws. The gasket 90 and the chamber 70, as illustrated, are shaped to conform to the particular type of container to be tested and, in the specific embodiment of the invention illustrated, the machine is adapted to operate on containers having flexible closure elements, as illustrated in Fig. 7, in which case the gasket 90 is ring-shaped and is of a size and contour to engage as near the periphery of the closure of the container as possible, the function of the gasket being to seal the top of the container in air-tight relation with the vacuum chamber. Formed within the body of the vacuum chamber is a semi-circular duct 79, which communicates with an inlet port 78 in the rear wall of the vacuum chamber. Also formed within the body of the chamber 70 are two valve chambers 80, 80 communicating with the respective ends of duct 79 through ports surrounded by valve seats 81, the upper portions of the valve chambers being connected to the open center of the vacuum chamber by ports 82, 82. Cooperating with the valve seats 81 are pin valves 83, the lower ends of the stems 84 of which extend beyond the inner face of the vacuum chamber adjacent the gasket 90. The upper end of the stem of each pin valve is guided in a socketed plug 85 threaded into the top of the vacuum chamber, and each valve is held to its seat by helical spring 86, the tension of which may be regulated by adjusting the plug 85. Preferably the plug is hollow and is closed by a cap 87, which permits access to the valve for cleaning, grinding and lubricating the same.

Threaded in a central opening in the outer face of the vacuum chamber 70 is a cage 72, in which is mounted, for reciprocatory movement, a pin 74, the lower end of which is guided in a suitable opening in the lower end of the cage, the upper end being guided in an adjusting nut 73 threaded into the end of the cage and serving to regulate the pressure exerted by the helical spring 76 surrounding the pin 74 and confined between an abutment 75 on the pin and the inner end of the nut 73, said abutment limiting the movement of the pin 74 toward the open face of the vacuum chamber. The relative position of the extreme lower end of pin 74, with reference to the opening in the lower face of the vacuum chamber, may be regulated by adjusting the cage 72 axially of the vacuum chamber, as will be understood. Both the cage 72 and the nut 73 may be locked in their adjusted positions by means of studs or bolts 72' and 73', respectively, as indicated in Figs. 8 and 8a, thereby preventing accidental displacement of the cage or variation in the force exerted by the spring 76 on the pin 74. The pin 74 is provided at its upper end with a buttress thread 77, with which cooperates a locking lever 93 pivoted at 92 to a spacer block 90 bolted to the face of the vacuum chamber, this construction admitting of vertical adjustment of the bearing block by the insertion of shims between the same and the face of the vacuum chamber to regulate the height of the locking lever 93. A helical spring 94, surrounding the central boss 91 of the spacer block, is anchored at one end in one of an arcuate series of holes 95 in the top of the spacer block, the other end of the spring bearing upon the locking lever 93 to hold the same in engagement with the pin 74. The opposite end of the lever 93 extends to a point substantially in alignment with the peripheral edge of the vacuum chamber, as clearly indicated in Figs. 8 and 8a. Preferably, each of the vacuum chambers is provided with a tapped opening closed by a screw plug 99, into which opening a pressure gauge may be attached, when necessary.

Secured to the periphery of the drum 60 in axial alignment with the pockets 63 and the vacuum chambers 70 is a series of plungers, each adapted to engage a receptacle carried in a corresponding pocket and to move the receptacle in the pocket until the closure end thereof is in sealing engagement with the gasket 90 carried by the cooperating vacuum chamber 70. These plungers are identical in construction and are illustrated in detail in Figs. 7, 7a and 7b. Each of the plunger elements includes a cylindrical bearing block 101 provided with legs 102 by means of which it is bolted to the periphery of the drum, as shown in Fig. 5. Reciprocally mounted in the bore of the bearing block 101 is a hollow plunger member 103 in which is telescopically mounted a plunger member 108 having a reduced outer portion 109, the member 108 being retained within the hollow member 103 by means of a collar 110 bolted to the outer edge of the member 103. The member 103 is held against rotation in the bearing block 101 by means of the spline 103', as indicated in Figs. 7 and 7a. A helical spring 111 mounted in the hollow member 103 tends to force the latter outward until it is arrested by engagement with the collar 110, the spring being designed to yield under excessive pressure to prevent damage to the mechanism and also to compensate for any variations in the heights of the containers being tested. Secured to the end 104 of member 103 is a bearing pin 105, which is locked in position by a nut 107 and is provided with a roller 106, preferably fitted with suitable wear washers, as indicated in detail in Fig. 7b. Fixed to the end of plunger section 109 by cross pin 114 and cotter pin 115 is a circular table-like element 112, which is adapted to engage the adjacent end of a container carried by the corresponding pocket 63 on the drum and, when the plunger is actuated, to force the closure end of the container into sealing engagement with the gasket 90 on the corresponding vacuum chamber 70, as will be more particularly explained hereinafter.

Preferably formed as an integral part of the housing 5 is a circular cam track 116 having a grooved periphery with which the rollers 106 of the plunger elements engage, said cam track having a low section extending substantially throughout the lower half of its periphery, and a high section in the upper portion of the periphery, which high and low sections are connected by intermediate inclines, so that the plungers will be moved toward the vacuum chambers as they approach the upper limit of their rotary movement with the drum, and will be moved in the opposite direction away from the vacuum chambers shortly after they begin the downward arc of their rotary movement with the drum.

Secured to the annular seat 62 of the spider 61 by bolts 121 is the casing 120 of a central distribution valve 125. The interior of the casing has a frusto-conical bore in which is accurately fitted a bushing 123 having a similar bore in which the valve plug 125 accurately fits, the bushing being secured to the casing by bolts and clips 124. Both the casing and bushing are provided with aligning ports 122 and 126, respectively, as more particularly illustrated in Fig. 9, and each of the ports in the casing is connected to the inlet port 78 of the corresponding vacuum chamber 70 by piping 146. The distribution valve is of the full floating type and comprises a tapered plug 125 provided with a central opening through which the shaft 6 passes, and abuts a thrust collar 125' having a conical or curved face engaging a complementary recess in the valve, said collar engaging an anti-friction bearing 125'', which, in turn, is acted upon by an annular thrust plate 129. The plate 129 is engaged by plungers 130 mounted in openings in the hub of the drum, each plunger being subject to a helical spring 131 in the opening, the tension of the spring being adjusted by a screw plug 132 engaging the threaded interior of the opening. This coordination constitutes an anti-thrust compensating means for the valve plug 125, and, when properly adjusted, supports the valve in its casing, so that the casing may be revolved with the drum without danger of the stationary valve plug sticking in the casing. Formed in the outer face of the valve plug are pockets 134 to receive compensating springs 134' and locking pins 135, by means of which the plug is held against rotation and with the proper degree of pressure within its rotary casing to prevent leakage between these parts. Pins 135 are carried by a collar 137 having a perforated flange 136, in the perforations of which the pins are slidably mounted, the collar being locked in a bushing 139, which is secured by one or more set screws 139' in the rear portion of the housing 4. The exterior of the sleeve 137 is screw threaded to receive an adjusting ring 138, which bears against the ends of the pins 135, whereby the latter are held in cooperative engagement with the sockets in the valve plug and serve to compress the springs 134' to the degree necessary to exactly compensate the adjustable thrust bearing on the opposite face of the valve in order to insure the floating effect of the valve and at the same time maintain the same in fluid-tight engagement with the casing.

The valve plug 125 is provided with an arcuate port 141 on its lateral face communicating with a vertical duct 140, which opens into the outer face of the plug and is connected by piping 144 with a tank 150, which is suspended under the table 1. The port 141 is adapted to register simultaneously with several of the ports 126 in the bushing 123, thereby connecting a like number of vacuum chambers 70 with the tank 150. The valve plug is also provided with an arcuate exhaust port 143 communicating with an opening 142 extending through the rear face of the valve and opening to the atmosphere, the port 143 registering simultaneously with several of the ports 126 in the bushing 123 and opening up communication between the vacuum chambers 70 and the atmosphere. The tank 150 is connected by piping 152 with a suitable pump (not shown) and interposed in the piping is an automatic fluid pressure valve 151, which regulates the fluid pressure in the tank and maintains the same at a predetermined value below atmospheric pressure, which reduced pressure is successively applied to the vacuum chambers by way of the distribution valve, as will be hereinafter explained.

Secured to the top of the table 1 is a bracket 155' provided with a vertical slot 156' in which is adjustably secured a pin 157', which lies in the path of rotation of the outer ends of the locking levers 93 carried by the vacuum chambers, said pin serving to swing the levers against the tension of springs 94 to release the pins 74 and permit the latter to be returned to their normal positions by springs 76.

A special form of inlet chute for directing the containers to be tested into the pockets 63 on the peripheral surface of the drum, includes a generally rectangular casting 156, mounted upon an A frame 155 on the feed side of the machine, the chute being inclined at an angle to feed the containers delivered thereto by gravity. The top of the chute is provided with a cover 157 hinged by means of a pintle 159, which is journaled in bearings formed on the sides of the chute, said pintle being provided with a helical spring 160 attached at one end to the chute and at the other end to an adjusting knob 161, which latter is fastened to the shaft by a suitable locking pin or screw, the spring serving to hold the cover in closed position and permitting it to be readily raised to remove damaged containers entering the chute.

In order to insure the feeding of single containers to unit pockets 63 on the drum, a lever 161 is connected to the cover 157 by means of a pintle 163 journaled in a bracket 165 on the cover, which pintle is provided with a tension spring 164, subject to adjustment by a nut or collar 167, in substantially the same manner as spring 160. The lever 161 is provided with a downwardly extending lug 162, which arrests the lowermost container in the chute and must be lifted by said container before the latter is permitted to pass out of the chute and into the drum pocket 63 registering with the mouth of the chute, the lever 161 being immediately returned to its lower position, after the passage of each container, so that the lug engages the succeeding container and holds the same until the next drum pocket 63 comes into register with the discharge end of the chute. The lever 161 is provided with a curved extension 161', which insures the retention of the container in the drum pocket during the initial movement of the drum pocket away from the chute. The chute is also provided with side guides 170 adjacent its discharge end, which serve to properly position the containers in the drum pockets between the heads 112 of the plungers and the vacuum chamber 70. These side guides are formed as tongue-like members pivoted to the sides of the chute by pintles 174 engaging ears 173 formed integrally with the sides of the chutes, the guides being adjusted and locked in adjusted position by means of threaded studs or bolts 175 passing through the rear extensions 171 of the guides and locked to the latter by nuts 175 and 176 on the respective sides of the extension, as more particularly shown in Fig. 13. An extension bridge member 177, attached to the bottom of the chute, serves as a bottom support for guiding the containers into the drum pockets.

The outlet chute is mounted on the opposite side of the machine from the inlet chute and preferably takes the form of an open ended casting 180, provided with an extension base, which is bolted to the top of the table 1. The chute comprises two sections, to wit, an upper section having an extension 190, which projects between the heads 112 of the plungers and the vacuum chambers 70 adjacent the periphery of the drum to engage the containers in the drum pockets and guide the same into the chute, and a lower section 210 of general elbow-shape, which opens into the upper chute section, the passage of the containers from the upper chute section to the lower chute section being controlled by special gate mechanism to be hereinafter described. The top chute section is provided with a cover 181, which is hinged to bearing lugs 183 on the side walls of the chute by means of a pintle 182 having a helical tension spring 184 anchored at one end to one of the lugs 183 and at the other end to an adjusting collar 185, which is locked to the pintle by a suitable cotter pin, the hinged cover permitting the ready removal of damaged containers. The cover is also provided with a curved extension 186 and pendent side guides 187, which serve to retain the containers in the drum pockets until said containers reach the extension bridge member 190 of the upper chute section. One of the side walls of the upper chute section is provided with one or more spring fingers 183', see Fig. 12, which serve to force the containers entering the upper chute section towards the opposite wall of the chute.

Upon reference to Figs. 3 and 12, it will be seen that the bottom of the upper chute section within the main housing comprises spaced trackways 191 formed on the sides of the chute, one of the tracks being interrupted at a point above the entrance to the lower chute section and the other trackway being reduced in width, as at 191', so as to permit containers entering the upper chute section to be diverted, under certain conditions to be hereinafter explained, into the lower chute section.

The continuity of the interrupted track section 191 is established or interrupted by a sliding gate 192 formed as a horizontal extension of an arm 193, which is locked in properly adjusted position on a piston rod 195. The gate 192 operates through a slot in the side wall of the chute housing and is adapted to be projected into and out of alignment with the interrupted trackway 191 of the upper chute section by the reciprocating movement of the piston rod 195, the inward movement of the gate being limited by a set screw 194 passing through the bracket 193 and engaging the side wall of the housing. The piston rod 195 extends transversely of the chute housing in the space between the upper and lower chute sections and has secured to one end thereof a pusher 197 having a horizontal arm 198, adapted to be projected through a slot 198' in the wall of the housing opposite that in which the gate 192 operates, said pusher serving to engage a container occupying a position in the upper chute in alignment with the said gate 192. Piston rod 195 is connected to piston 203 operating in a cylinder 202, which is attached to a lateral bracket formed integrally with the chute housing, said cylinder being provided with an adjustable set screw 204, which limits the inward movement of the piston. The cylinder is connected by a pipe 205 with an automatic segregating valve, which operates to successively reduce the pressure in the cylinder to cause a retraction of the piston and admit atmospheric pressure to the cylinder, as will be hereinafter explained. The retractile movement of the piston withdraws the gate member 192 and interrupts the continuity of one of the track members in the upper chute section and projects the pusher into the chute section, and the opposite movement of the piston to restore the gate and the pusher is effected by means of a tension spring 199, which is attached at one end to the bracket 193 carrying the gate 192 and, at its opposite end, to an eye bolt 200, which engages an opening in the wall of the chute housing opposite the gate and is adjusted by a wing-nut 201.

Secured to one side wall of the discharge chute 180 is a bracket 206, which is generally parallel to the curved surface of the drum and is provided with a longitudinal series of holes to permit the segregating valve mechanism to be secured thereto in properly adjusted relation, as indicated in Fig. 6, the structural details of the valve being shown in Figs. 10 and 11. The valve mechanism includes a casing 208 having an inwardly tapering bore and a circular bottom recess 211, said casing being secured by screws to an arc-shaped plate 207, by means of which the valve mechanism is adjustably mounted on the bracket 206. The casing is provided with a port 209 in which the pipe 205 from cylinder 202 connects and with a second port 210 connected by pipe 250 to the tank 150. Fitted within the casing 208 is a tapered valve plug 212 having a central chamber 213 with a threaded opening in its bottom closed by a screw plug 214, which has a peripheral flange which engages the shoulder of the counterbored recess 211 in the bottom of the casing, the flange of the plug having a series of openings 220 therein connected by an annular duct 219, said openings 220 also being adapted to receive a locking bolt 230 by means of which the screw plug 214 is secured to the valve plug 212 against relative movement, after said screw plug has been adjusted to seat the valve in its casing. The valve is provided with a stem 221 having a head with a scale thereon, upon which is adjustably mounted an operating arm 223, secured in clamped position by a nut 224 and washer 225 engaging the upper threaded end of the valve stem. The valve plug is provided with spaced ports 215 and 216 communicating with the central chamber 213, the port 215 being extended peripherally of the face of the valve, so as to establish an open passage through the valve, when the ports 215 and 216 register with the ports 210 and 209 in the valve casing. Also formed in the body of the plug is a radial port 217 connected with the longitudinal port 218 opening through the bottom of the plug and communicating with the annular duct 219 and, therefore, with the counterbored recess 211 in the bottom of the casing, which latter connects with the atmosphere by a port 219', so that, when port 217 is brought into registry with port 209 of the valve casing, atmospheric pressure is admitted to cylinder 202 of the gate operating mechanism. The supporting plate 207 is provided with a screw threaded opening in alignment with the center of the screw plug 214 to receive a tube 234 in which is mounted a conical ended shouldered stem 231, the upper end of which engages a conical recess in the center of the screw plug, said stem being surrounded by a helical compression spring 233, which is adjusted by a nut 236 engaging the screw threads on the lower portion of the tube 234, said nut carrying a bushing 235 upon which the helical spring rests. The pin or stem 231 constitutes a resilient support for the valve plug, the tension of the spring being adjusted to compensate for the atmospheric pressure on the valve plug to prevent the latter sticking. The arm 223 for operating the valve plug 212 is, as stated, adjustably mounted on the stem of the valve and is provided with an index mark registering with the scale on the periphery of the flanged valve stem, so that the adjustment and timing of the valve may be effected with accuracy. Connecting the valve operating arm 223 with the bracket 206 is a retractile spring 240, which normally returns the valve operating arm to inoperative position, in which the port 217 of the valve plug is in registry with the port 209 of the valve casing to establish communication between the gate operating cylinder 202 and the atmosphere, as hereinbefore explained. The connection between the spring 240 and the bracket 206 is such as to admit of a ready adjustment of the tension of the spring.

As indicated in Fig. 1, the machine is provided with a switch box 241 and a conduit 242 containing the leads to the electric motor, the switch box being located on the A frame adjacent the supply chute to the machine and is, therefore, accessible to the operator in charge of the feeding of the containers to the machine.

As hereinbefore indicated, this particular apparatus is adapted to automatically test containers of foodstuffs or the like at a high speed of operation and to automatically segregate the containers which are defective or deficient in internal vacuum conditions from those having a normal internal vacuum, or a reduced internal pressure within certain prescribed limits, the containers having flexible wall sections, in the present instance the end closures, which are moved a certain amount under the application of differential pressures within and without the containers. For purposes of illustration, the following conditions are indicated: It is assumed that a normal container of the character stated has an internal vacuum equal to seven inches of mercury and that a force approximately equivalent to four inches of vacuum applied to the flexible section or end closure of the container is necessary to cause the said flexible section to move outwardly or "flip" from its normal relation, which is usually concaved, to a convex relation or position, if the pressure within the container is substantially equal to that of the atmosphere. In other words, if the container, instead of having a vacuum therein equivalent to seven inches of mercury, has a zero vacuum or atmospheric pressure, the closure "flips" or convexes upon the application of four inches or more of applied external force in the form of reduced pressure or partial vacuum, the pressure represented by the four inches of vacuum being that actually necessary to distort the material, usually metal, of the flexible section. Therefore, the normal closure of a container having seven inches of vacuum therein would "flip" at four plus seven, or a total of eleven inches of externally applied vacuum. It is desired to select automatically from a series of containers normally having seven inches or more of internal vacuum, all containers having zero vacuum, or those known as "leakers", meaning those which have taken in a sufficient amount of atmospheric pressure to reduce the normal vacuum of seven inches to something less than seven inches, and, in most cases, to zero vacuum or atmospheric pressure, which almost inevitably occurs when the containers stand a sufficient length of time before testing, to permit atmospheric pressure to enter the containers through small pores or openings in the walls thereof, or by reason of other defects in the containers or in the sealing means therefor. About two or three inches of vacuum is allowed for commercial variations in the thickness of the metal in the container walls, such as the closure elements, so that, in order to separate the containers having no vacuum or an excessive internal pressure, the degree of vacuum applied to the closure elements by the vacuum chambers 70 should be four plus three, or seven inches of mercury. It will be appreciated that the amount of external vacuum or applied reduced pressure required to "flip" the flexible portion of the container depends upon several factors, such as the thickness and character of the material, whether the same has been heat treated or annealed, the contour markings on its surface, the effect of the impact of the contour marking dies, etc. It is, therefore, necessary in adjusting the machine for testing containers of this specific character, to make certain simple preliminary tests to determine the amount of vacuum required to "flip" the flexible sections or closures of each particular type of container having high internal fluid pressure or substantially low vacuum. On the basis of the factors hereinbefore assumed it will require seven plus four plus three or fourteen inches or more of externally applied vacuum to "flip" the closure of a container having a seven inch normal internal vacuum. Therefore if a vacuum of ten or twelve is applied to the containers only those that are under seven inches internal vacuum will "flip". It may be found that, in certain types of containers, the flexible sections, such as the end closure, will not produce the hereinbefore described "flip", but will nevertheless move an appreciable amount when subjected to a vacuum or reduced fluid pressure externally applied, and the apparatus will operate effectively even when the movements of the closures under the differential applied pressure is very slight, as the mechanism may be adjusted to respond to a very small movement of the closure.

The operation of the apparatus illustrated and hereinbefore described is as follows: The series of containers to be tested are either automatically fed to the testing apparatus or may be fed by hand to the inlet conveyor chute 156, from which they are delivered one at a time to the pockets 63 on the periphery of the drum, each container being accurately guided and positioned in the pocket by the lower extensions 177 on the bottom of the chute, the side guides 170, the spacing member 162 and the curved extension 161' of the spacing arm 161. As each container is moved upward from the supply chute by the rotation of the drum, the plunger in alignment with the pocket in which the particular container is located is moved transversely of the drum by the co-action of the roller of the plunger and the circular cam track, thereby causing the plunger to engage the container and force or move the same in the pocket until the closure end of the container is forced in fluid-tight engagement with the gasket 90 of the corresponding vacuum chamber 70. The movement of the container by the plunger engaging the same causes the closure of the container to engage the stems 84 of valves 83 in the vacuum chamber to unseat the valves, shortly after which the rotary movement of the casing 120 of the distribution valve brings port 122 in the casing, which is connected to the particular vacuum chamber 70 with which the container is engaged, into registry with ports 141 and 140 and establishes communication between said vacuum chamber and the tank 150, thereby reducing the pressure in said chamber to that maintained in the tank and imposing this reduced pressure on the outer face of the closure of the container, said reduced pressure being equal to that represented by approximately twelve inches of mercury in a standard vacuum gauge when the apparatus is adjusted to test containers of the character hereinbefore stated which require a reduced pressure equal to fourteen inches of mercury applied to the closure to cause the latter to "flip" or move outwardly, when the degree of vacuum in the container equals about seven inches of mercury. If the degree of vacuum or internal pressure in the container is normal, no movement of the closure results and the container is passed through the machine and ultimately delivered to and discharged from the upper section of the discharge chute 180. If, however, the internal pressure of the container is high, or the vacuum therein is deficient, the closure of the container is "flipped" or caused to move outwardly, by the predominant pressure in the container over that in the vacuum chamber, and the outward movement of the closure causes the latter to engage the pin 74 in the vacuum chamber, moving said pin outwardly, in which projected position the pin is locked by the locking lever 93 engaging the buttress thread 77 on the outer end of said pin. As the rotary movement of the drum continues, communication between the vacuum chamber 70 and the tank 150 is cut off by the distribution valve and communication established between said vacuum chamber and the air, by way of ports 143 and 142 of the distribution valve, which ports have moved into registry with the port 126 of the distribution valve casing, which is connected to said vacuum chamber by corresponding pipe 146. Immediately thereafter, the plunger which had previously moved the container into engagement with the vacuum chamber is retracted by the cam track and the spring actuated pins 84 of the valves 83 force the container out of contact with the sealing ring of the vacuum chamber and the further continuation of the rotary movement of the drum advances the container, which is now free in the pocket 63 of the drum, to a point opposite the mouth of the upper section of the discharge chute 180. At or about this time, the projected and locked pin 74 of the vacuum chamber with which the container had been in engagement strikes operating arm 223 of the segregating valve, which imparts a partial rotation of the plug 212 of said valve against the tension of retractile spring 240 to bring ports 215 and 216 in the valve plug into registry with the ports 210 and 209, respectively, of the casing, thereby establishing communication between the tank 150 and the cylinder 202 of the gate retracting motor, so that the pressure in the cylinder is reduced to that in said tank 150 and the atmospheric pressure forces the piston inwardly in said cylinder, thereby withdrawing the gate 192 and interrupting the trackway 191 of the upper discharge chute section on which the container is resting and, at the same time, moving the horizontal arm 198 of pusher 197 inwardly through the slot 198' until it engages the particular container and forces the latter laterally of the chute, so that it drops through the opening in the trackway, caused by the withdrawal of the gate 192, into the lower section of the chute over the bottom 210 of which it rolls until it is discharged from the open mouth of the lower chute section. In order to effect the operation of the gate mechanism at the proper time to permit the defective container to drop from the upper discharge chute section into the lower chute section, it is necessary to adjust the segregating valve assembly on its supporting bracket arm 207, so that the timing of the operation of the segregating valve may be accurately regulated to effect this result. This adjustment is effected by shifting the support for the segregating valve, so that the plug of said valve will be moved to its full opened position to establish communication between tank 150 and the cylinder 202 of the gate operating motor at the instant the defective container reaches the portion of the upper chute section occupied by the gate, as will be understood. Immediately after the pin on the vacuum chamber passes out of engagement with the operating arm 223 of the segregating valve, the latter is returned to its normal position, which establishes communication between the cylinder 202 of the gate motor and the atmosphere, thereby permitting the retractile spring 199 to return the gate 192 to its normal operative position and withdraw the pusher 197, so that the continuity of the upper discharge chute is reestablished and normal containers may pass freely through said chute section.

None of the containers which have a normal internal vacuum or reduced pressure, within permissive limits, will cause any outward movement of the indicating pins 74 of the vacuum chambers with which said containers are in contact, because no outward movement of the closures of the containers is produced by the reduced pressure in the vacuum chambers, consequently these indicating pins do not engage the operating arm of the segregating valve and the latter is not operated to withdraw the gate, so that the normal containers enter the upper chute section and pass out of the discharge end thereof to a suitable conveyor or other means for collecting the same. The pin 74 remains in its projected position until its locking lever 93 engages trip pin 157' mounted on table 1, below the drum, which swings the locking lever on its pivot to disengage said lever from the buttress thread 77 on the pin, thereby permitting the latter to be returned to its normal position by the retractile spring 76, and this particular vacuum chamber is restored to condition to engage another container, as the latter is fed to the drum pocket cooperating with the said particular vacuum chamber, as said drum pocket comes opposite the lower end of the feed chute 156.

As hereinbefore indicated, the particular machine illustrated and described is exemplary as adapted to testing containers of a certain type, and it is obvious that the mechanism is susceptible of various changes and modifications to accommodate containers of different types, forms and sizes without departing from the spirit of the invention, but all such changes are within the expected skill of a designer of such machines. Preferably, the testing of containers is effected under normal atmospheric temperature conditions at an average temperature of sixty-five degrees centigrade or under in the containers and the contents thereof. The testing may be effected previous to storage, or prior or subsequent to the labelling of the containers previous to shipment. As a final guarantee to the consumer as to the normalcy of the containers and their contents, the tests may be effected by the wholesaler just previous to distributing the goods to the retailer.

What I claim is:

1. A machine for testing sealed containers, comprising a drum rotating about a horizontal axis and having a peripheral series of container receiving pockets, means carried by the drum for subjecting the containers successively to reduced fluid pressure, means associated with the drum for moving the containers in the pockets successively into engagement with the reduced pressure applying means, and means controlled by the movement of the walls of containers having vacuum deficiencies to segregate said containers from those having normal vacuum conditions.

2. A machine for testing sealed containers, comprising a drum rotating about a horizontal axis and having a peripheral series of container receiving pockets, chambers carried by the drum in axial alignment with said pockets and adapted to be engaged by said containers, means for moving the containers in said pockets into sealed engagement with said chambers, means for reducing the fluid pressure in said chambers, and means controlled by the movement of the walls of containers having vacuum deficiencies to segregate said containers from those having normal vacuum conditions.

3. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers to act on the walls of said containers, and means controlled by the movement of the walls of containers having vacuum deficiencies to segregate said containers from those having normal vacuum conditions.

4. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, movable abutments carried by said chambers and actuated by the movement of the walls of containers having vacuum deficiencies, and means controlled by said movable abutments to segregate the containers having vacuum deficiencies.

5. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, pins carried by said chambers and advanced by the movement of the walls of containers having vacuum deficiencies, means for locking said pins in advanced position, and means actuated by said locked pins for segregating said containers from those having normal vacuum conditions.

6. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, pins carried by said chambers and advanced by the movement of the walls of containers having vacuum deficiencies, means for locking said pins in advanced position, and fluid pressure means actuated by said locked pins for segregating said containers from those having normal vacuum conditions.

7. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, pins carried by said chambers and advanced by the movement of the walls of containers having vacuum deficiencies, means for locking said pins in advanced position, fluid pressure means actuated by said locked pins for segregating said containers from those having normal vacuum conditions, and means for releasing said locking pins.

8. A machine for testing sealed containers comprising a drum rotating about a horizontal axis and having a peripheral series of container receiving pockets, a feed chute for delivering and positioning containers in said pockets, chambers carried by the drum in axial alignment with said pockets, means for moving the containers in said pockets into sealing engagement with said chambers, means for successively inducing and relieving fluid pressure in said chambers, projectable means carried by said chambers operated by the movement of the walls of containers having vacuum deficiencies, a discharge chute having a movable section to permit containers to drop through the chute, fluid pressure means moving said section to break the continuity of the chute, a valve controlling said fluid pressure means, and means carried by the valve engaged by the projectable means when projected to actuate the valve when a defective container occupies the movable section of the chute.

9. A machine for testing sealed containers comprising a drum rotating about a horizontal axis and having a peripheral series of container receiving pockets, a feed chute for delivering and positioning containers in said pockets, chambers carried by the drum in axial alignment with said pockets, means for moving the containers in said pockets into sealing engagement with said chambers, means for successively inducing and relieving fluid pressure in said chambers, projectable means carried by said chambers operated by the movement of the walls of containers having vacuum deficiencies, a discharge chute having a movable section to permit containers to drop through the chute, fluid pressure means moving said section to break the continuity of the chute, a valve controlling said fluid pressure means, and an arm carried by the valve engaged by the projectable means when projected to actuate the valve when a defective container occupies the movable section of the chute.

10. A machine for testing sealed containers comprising a drum rotating about a horizontal axis and having a peripheral series of container receiving pockets, a feed chute for delivering and positioning containers in said pockets, chambers carried by the drum in axial alignment with said pockets, means for moving the containers in said pockets into sealing engagement with said chambers, means for successively inducing and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, and means carried by the valve engaged by the projectable means when projected to actuate the valve when a defective container occupies the movable section of the chute.

11. A machine for testing sealed containers comprising a drum rotating about a horizontal axis and having a peripheral series of container receiving pockets, a feed chute for delivering and positioning containers in said pockets, chambers carried by the drum in axial alignment with said pockets, means for moving the containers in said pockets into sealing engagement with said chambers, means for successively inducing and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, and an arm carried by the valve engaged by the projectable means when projected to actuate the valve when a defective container occupies the movable section of the chute.

12. A machine for testing sealed containers comprising a drum rotating about a horizontal axis and having a peripheral series of container receiving pockets, a feed chute for delivering and positioning containers in said pockets, chambers carried by the drum in axial alignment with said pockets, means for moving the containers in said pockets into sealing engagement with said chambers, means for successively inducting and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, an arm carried by the valve engaged by the projectable means when projected to actuate the valve when a defective container occupies the movable section of the chute, and means to release the lock for the projectable means after the latter has functioned.

13. A machine for testing sealed containers comprising a drum rotating about a horizontal axis and having a peripheral series of container receiving pockets, a feed chute for delivering and positioning containers in said pockets, chambers carried by the drum in axial alignment with said pockets, a series of plungers in alignment with said pockets, a stationary cam for reciprocating said plungers to move the containers into sealing engagement with said chambers, means for successively inducing and relieving fluid pressure in said chambers, projectable means carried by said chambers operated by the movement of the walls of containers having vacuum deficiencies, a discharge chute having a movable section to permit containers to drop through the chute, fluid pressure means moving said section to break the continuity of the chute, a valve controlling said fluid pressure means, and means carried by the valve engaged by the projectable means when projected to actuate the valve when a defective container occupies the movable section of the chute.

14. A machine for testing sealed containers comprising a drum rotating about a horizontal axis and having a peripheral series of container receiving pockets, a feed chute for delivering and positioning containers in said pockets, chambers carried by the drum in axial alignment with said pockets, a series of plungers in alignment with said pockets, a stationary cam for reciprocating said plungers to move the containers into sealing engagement with said chambers, means for successively inducing and relieving fluid pressure in said chambers, projectable means carried by said chambers operated by the movement of the walls of containers having vacuum deficiencies, a discharge chute having a movable section to permit containers to drop through the chute, fluid pressure means moving said section to break the continuity of the chute, a valve controlling said fluid pressure means, and an arm carried by the valve engaged by the projectable means when projected to actuate the valve when a defective container occupies the movable section of the chute.

15. A machine for testing sealed containers comprising a drum rotating about a horizontal axis and having a peripheral series of container receiving pockets, a feed chute for delivering and positioning containers in said pockets, chambers carried by the drum in axial alignment with said pockets, a series of plungers in alignment with said pockets, a stationary cam for reciprocating said plungers to move the containers into sealing engagement with said chambers, means for successively inducing and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, and means carried by the valve engaged by the projectable means when projected to actuate the valve when a defective container occupies the movable section of the chute.

16. A machine for testing sealed containers comprising a drum rotating about a horizontal axis and having a peripheral series of container receiving pockets, a feed chute for delivering and positioning containers in said pockets, chambers carried by the drum in axial alignment with said pockets, a series of plungers in alignment with said pockets, a stationary cam for reciprocating said plungers to move the containers into sealing engagement with said chambers, means for successively inducing and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, and an arm carried by the valve engaged by the projectable means when projected to actuate the valve when a defective container occupies the movable section of the chute.

17. A machine for testing sealed containers comprising a drum rotating about a horizontal axis and having a peripheral series of container receiving pockets, a feed chute for delivering and positioning containers in said pockets, chambers carried by the drum in axial alignment with said pockets, a series of plungers in alignment with said pockets, a stationary cam for reciprocating said plungers to move the containers into sealing engagement with said chambers, means for successively inducing and relieving fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of the chute, a valve controlling said fluid pressure means, an arm carried by the valve engaged by the projectable means when projected to actuate the valve when a defective container occupies the movable section of the chute, and means to release the lock for the projectable means after the latter has functioned.

18. A machine for testing sealed containers comprising a drum rotating about a horizontal axis and having a peripheral series of container receiving pockets, a series of chambers mounted on said drum in axial alignment with said pockets, means for moving the containers in said pockets into sealing engagement with said chambers, a valve mounted centrally of said drum and connected with said chambers for successively inducing and relieving reduced fluid pressure in said chambers, and means carried by said chambers operated by the movements of the walls of containers having vacuum deficiencies to segregate said containers from those having normal vacuum conditions.

19. A machine for testing sealed containers comprising a drum rotating about a horizontal axis and having a peripheral series of container receiving pockets, a series of chambers mounted on said drum in axial alignment with said pockets, means for moving the containers in said pockets into sealing engagement with said chambers, a valve mounted centrally of said drum and connected with said chambers for successively inducing and relieving reduced fluid pressure in said chambers, and pins carried by said chambers operated by the movements of the walls of containers having vacuum deficiencies to segregate said containers from those having normal vacuum conditions.

20. A machine for testing sealed containers comprising a drum rotating about a horizontal axis and having a peripheral series of container receiving pockets, a series of chambers mounted on said drum in axial alignment with said pockets, fluid pressure operated means for moving the containers in said pockets into sealing engagement with said chambers, a valve mounted centrally of said drum and connected with said chambers for successively inducing and relieving reduced fluid pressure in said chambers, and pins carried by said chambers operated by the movements of the walls of containers having vacuum deficiencies to segregate said containers from those having normal vacuum conditions.

21. A machine for testing sealed containers comprising a drum rotating about a horizontal axis and having a peripheral series of container receiving pockets, chambers carried by said drum in axial alignment with said pockets, a series of plungers in alignment with said pockets, a stationary cam for reciprocating said plungers to move the containers into sealing engagement with said chambers, a valve mounted centrally of said drum and communicating with said chambers for successively inducing and relieving reduced fluid pressure in said chambers, and means carried by said chambers operated by the movement of the walls of containers having vacuum deficiencies to segregate said containers from those having normal vacuum conditions.

22. A machine for testing sealed containers comprising a drum rotating about a horizontal axis and having a peripheral series of container receiving pockets, chambers carried by said drum in axial alignment with said pockets, a series of plungers in alignment with said pockets, a stationary cam for reciprocating said plungers to move the containers into sealing engagement with said chambers, a valve mounted centrally of said drum and communicating with said chambers for successively inducing and relieving reduced fluid pressure in said chambers, pins carried by said chambers operated by the movement of the walls of containers having vacuum deficiencies, and fluid pressure operated means controlled by said pins to segregate said containers from those having normal vacuum conditions.

In testimony whereof I affix my signature.

FRANCIS H. LANDRUM.